United States Patent [19]
Givoni

[11] Patent Number: 5,895,701
[45] Date of Patent: Apr. 20, 1999

[54] EXTRUDED PANEL UNIT FOR CONSTRUCTIONAL PURPOSES

[75] Inventor: Shaul Givoni, D.N. Upper Galilee, Israel

[73] Assignee: Dan-Pal, D.N. Upper Galilee, Israel

[21] Appl. No.: 08/915,571

[22] Filed: Aug. 21, 1997

[30] Foreign Application Priority Data

Feb. 21, 1997 [IL] Israel ............................................. 27577
Feb. 21, 1997 [IL] Israel ............................................. 27578

[51] Int. Cl.$^6$ ....................................................... B32B 3/12
[52] U.S. Cl. ................... 428/116; 52/793.1; 264/177.12; 428/118
[58] Field of Search .............................. 428/99, 100, 116, 428/118; 52/793.1; 264/177.12

[56] References Cited

U.S. PATENT DOCUMENTS

| | | | |
|---|---|---|---|
| 4,573,300 | 3/1986 | Bezner | 428/100 X |
| 5,348,790 | 9/1994 | Ben-zvi et al. | 428/178 |

*Primary Examiner*—Henry F. Epstein
*Attorney, Agent, or Firm*—Beveridge, Degrandi, Weilacher & Young, L.L.P.

[57] ABSTRACT

An extruded panel unit for constructional purposes having two sheet-like major surfaces interconnected and spaced apart by an internal honeycomb structure which divides the space between the major surfaces into a plurality of sub-spaces. The extruded panel unit may also have joining flanges to allow for connection to other extruded panel units.

15 Claims, 5 Drawing Sheets

EXTRUDED PANEL UNIT FOR CONSTRUCTIONAL PURPOSES

BACKGROUND OF THE INVENTION

1. Field of the Invention

The present invention relates to extruded, modular panels for use in the construction of walls, ceilings, and the like in buildings, which panels may be either opaque or light-transmitting.

2. Description of the Related Art

Plastic insulative panels are known in the art, and commonly consist of two spaced-apart extruded sheets of a plastic material constituting major surfaces of the panels, integrally connected by ribs perpendicularly or obliquely oriented with respect to the sheets, producing a plurality of air spaces having a rectangular cross-section. Similarly constructed panels also include an intermediate sheet, thus forming two enclosed spaces between the major surfaces.

In U.S. Pat. No. 4,573,300, there is also disclosed a further type of panel, wherein the ribs zigzag between the two major surfaces and are attached to them via short auxiliary ribs, which extend from the inflection points of the zigzagging main ribs to the respectively nearest one of the major surfaces. The purpose of this arrangement is to reduce to a minimum the mass of material at the point of attachment of the ribs to the major surfaces. At the same time, these auxiliary ribs being relatively short, the structural reinforcement effect of the main ribs remains substantially unimpaired.

All of the above-described prior art panels having generally only two, or at most three, enclosed spaces, are formed with the major surface, which is adapted to face the outside, having a thickness greater than the thickness of the other major surface, for the purpose of withstanding buckling. Furthermore, in order to enhance the strength of such panels to withstand pressures, such as wind pressures applied thereupon, the areas bracketing both sides of the connection between a rib and the major surface adapted to face the outside of the structure, have a substantially thicker cross-section, projecting towards the interior of the panel. This forms arch-like spaces adjacent to the outwardly facing major surface, thereby increasing the overall cost of the extrusion head and the cost of the panel due to the added reinforcing material used, not to mention the added material and weight.

Prior art panels are also formed such that an internal support structure is formed in a manner that all of the support walls are normal to the two major surfaces to form chambers normal to the major surfaces. The internal support structure is formed separate from the two major surfaces. After forming, the internal support structure is fixed by gluing between the two major surfaces, which are separately formed.

SUMMARY OF THE INVENTION

The present invention has as an objective to decrease the amount of materials required for the manufacture of an extruded panel unit suitable for use as a wall surface, ceiling, etc. in buildings. This is accomplished by use of an internal honeycomb structure having walls forming channels running parallel with and between the two major surfaces of an extruded panel.

The honeycomb structure inherently provides insulation and strength to the overall construction of the panel. The present invention also decreases the possibility of buckling of the panel due to random forces acting upon it.

The panels of the present invention are useful in the construction of buildings and may serve as a wall, floor, ceiling, roof, or any other element of the construction that would benefit from the qualities of this invention.

The invention will now be described in connection with certain preferred embodiments with reference to the following illustrative figures, so that it may be more fully understood.

With reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENT

The panels illustrated in FIGS. 1–2 and 4–7 can be of any length or width as the end purpose necessitates. The internal structures of panels 2, 20, and 30 are essentially the same and such structure will be described only in relation to panel 2.

Figure 1:
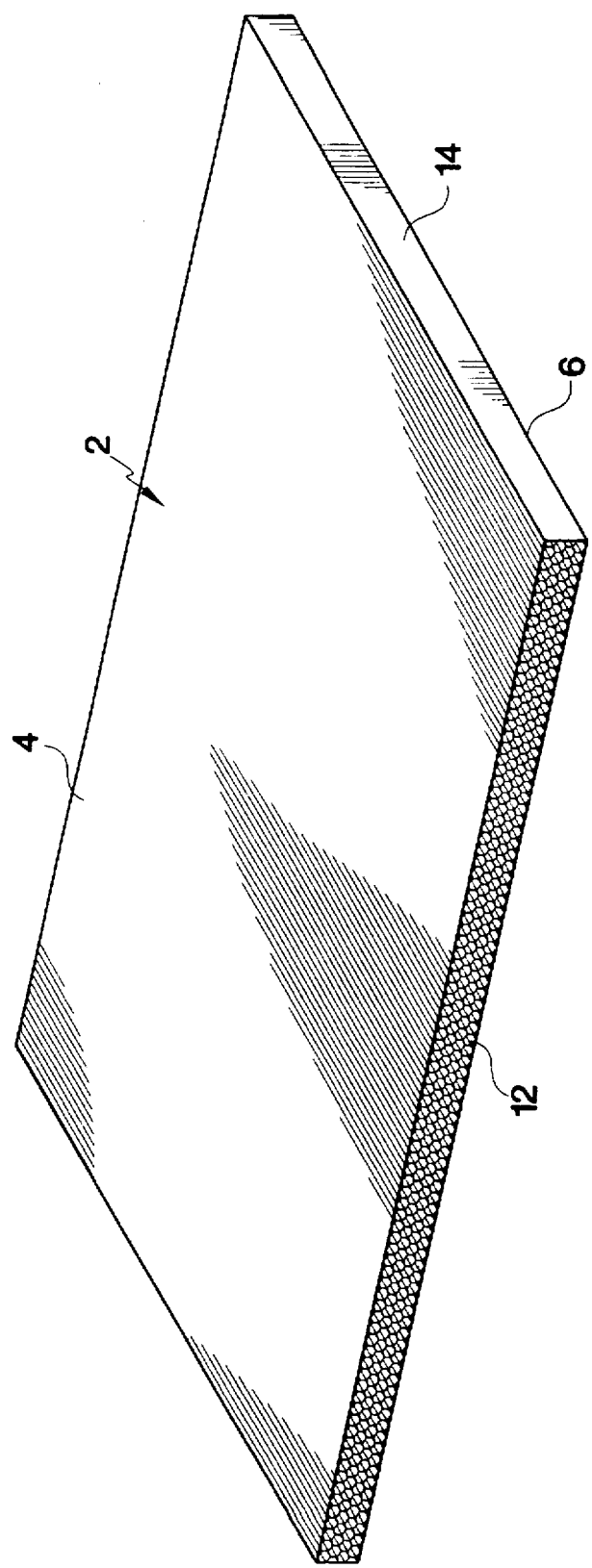
FIG. 1 is a cross-sectional perspective view of the panel according to the invention.
Figure 2:
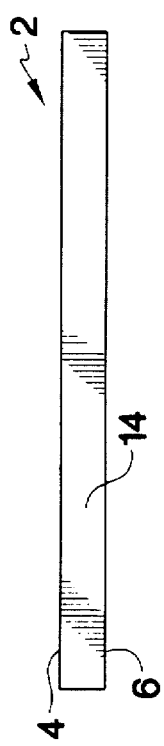
FIG. 2 is a plan view of one end of the panel according to the invention.
Figure 3:
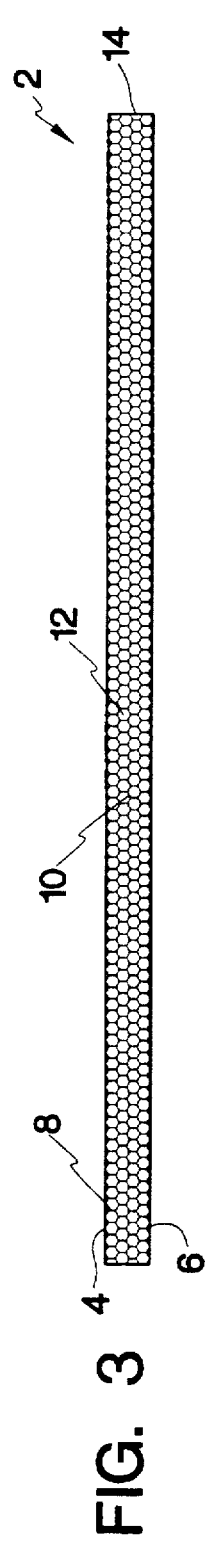
FIG. 3 is a cross-sectional view of the panel according to the invention.
Figure 4:
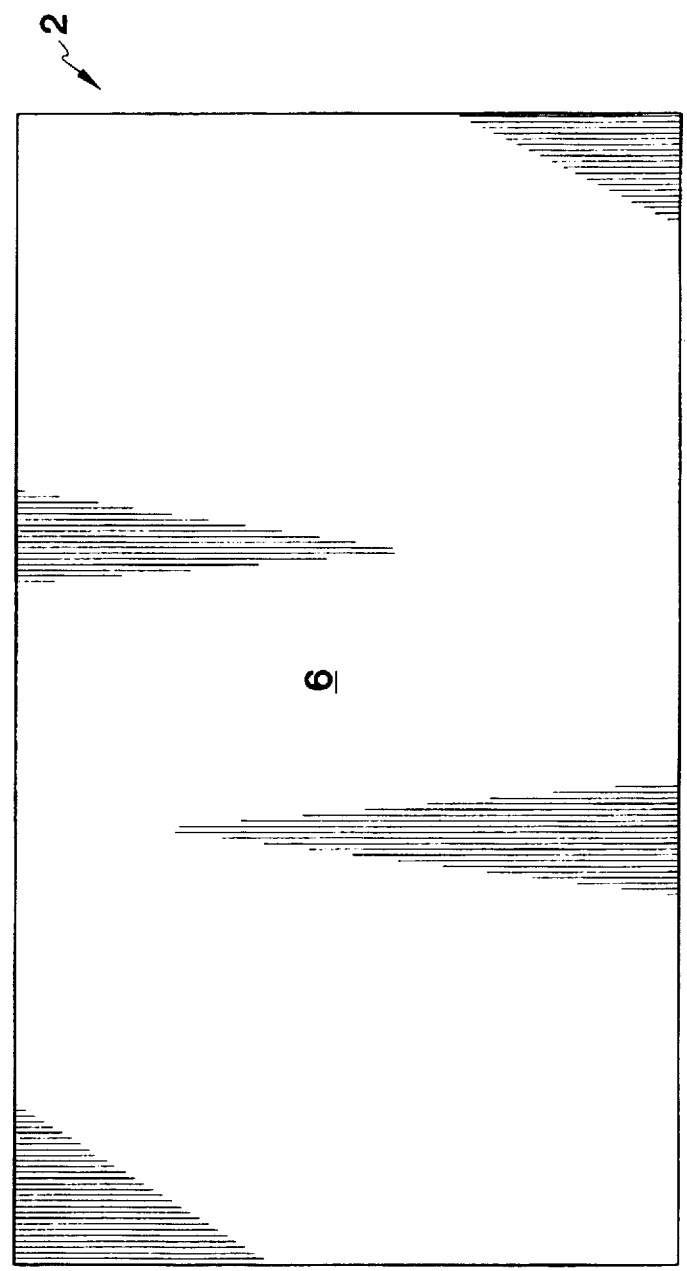
FIG. 4 is a plan view of the bottom of the panel according to the invention.

As seen in FIG. 1, plastic panel unit 2 is formed with two sheet-like major surfaces 4 and 6 interconnected and spaced apart by a plurality of honeycomb cells 12. The two major surfaces 4 and 6 and the honeycomb structure are integrally formed together via an extrusion process to form the composite panel. The honeycomb structure allows for the use of very thin walls 8 and 10 to form the honeycomb cells 12, which allows for the overall weight of the panel to be very low. The use of thin walls also allows transmission of light through the panel 2 if transparent material is used. The honeycomb structure provides substantial mechanical strength to the panel 2 and improves thermal insulation by subdividing the space between the two major surfaces 4 and 6 into a plurality of closed subspaces defined by the honeycomb cells 12. The added mechanical strength that results from the use of the honeycomb structure assists in the prevention of buckling of the entire panel 2.

Figure 5:
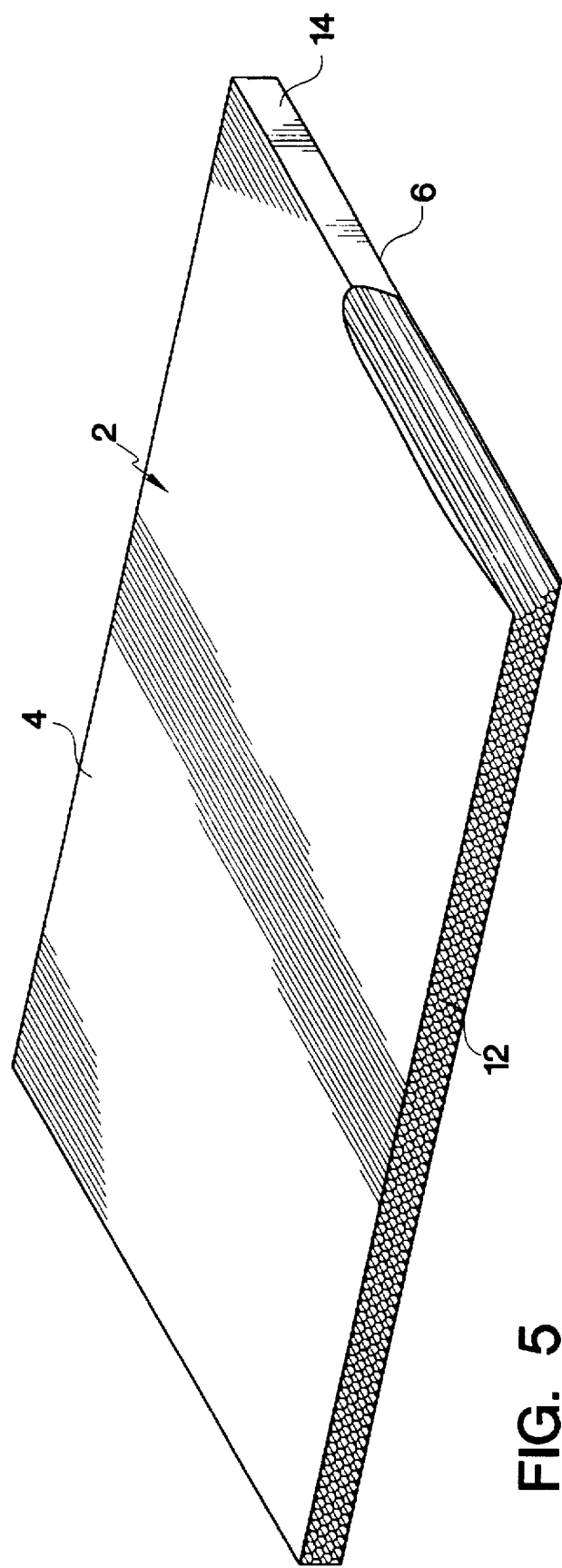
FIG. 5 is a further cross-sectional view of the panel to exemplify the channel-like structure of the honeycombs according to the invention.

The sheet-like major surfaces 4 and 6 may be of any length and width. Adjacent honeycomb cells 12 share common walls between them. The honeycomb cells located in the internal levels of the honeycomb structure which are not in contact with the panel surfaces 4, 6 comprise two vertical walls 8 and four angular walls 10 to form a hexagonal cross-section of the honeycomb. Thus such honeycomb cells provide cross-sectional hexagonal channels that extend the width of the panel, as shown in FIG. 5. The honeycomb cells, as shown in FIG. 1, are layered in four levels, with the top and bottom levels being of partial honeycomb cells connected to a respective major surface. The partial honeycomb cell structure consists of two vertical walls 8 joined by two angular walls 10 that oppose the major surface that is connected to the partial honeycomb. Each of the honeycomb cells are preferably substantially equal in size as the length of walls 8 and 10 are substantially equal. The middle levels of honeycomb cells preferably have identical cross-sectional areas, while the upper and bottom levels of honeycomb cells have different cross-sectional areas.

As further seen in FIG. 1, the panel 2 can, optionally, be provided with a sidewall 14, which may be coextruded with either or both the honeycomb structure and the two major surfaces 4 and 6. The major surface 4 is intended to be disposed to face the outside, i.e., the unexposed side of the wall, ceiling, etc. formed by such panels, and therefore should be slightly thicker (e.g., 0.5–0.8 mm) than the second major surface 6 and the sidewall 14 (e.g., 0.4–0.6 mm), which are protected from the outside elements. The walls 8 and 10 of the honeycombs (e.g., 0.1 mm) are thinner than the major surface 4.

The panel constructed as above provides the advantage of increasing thermal insulation as compared with the prior art panel having the same overall dimensions. Division of the space between the two major surfaces of the panel into a plurality of honeycomb cells having their hexagonal channels extending parallel to the major surfaces, allows the decrease in the thickness of the panel surfaces and the support walls forming the honeycomb structure, thereby obtaining a reduction in the quantity of material used, while simultaneously improving the thermal capability of the panel and improving its resistance against buckling.

The panels of this invention can be formed in a variety of bent or curved shapes and are not explicitly limited to being flat panels. These panels may be used as walls, floors, ceilings, roofs or any other building element that could benefit from the inherent advantages of the panel structure.

Figure 6:
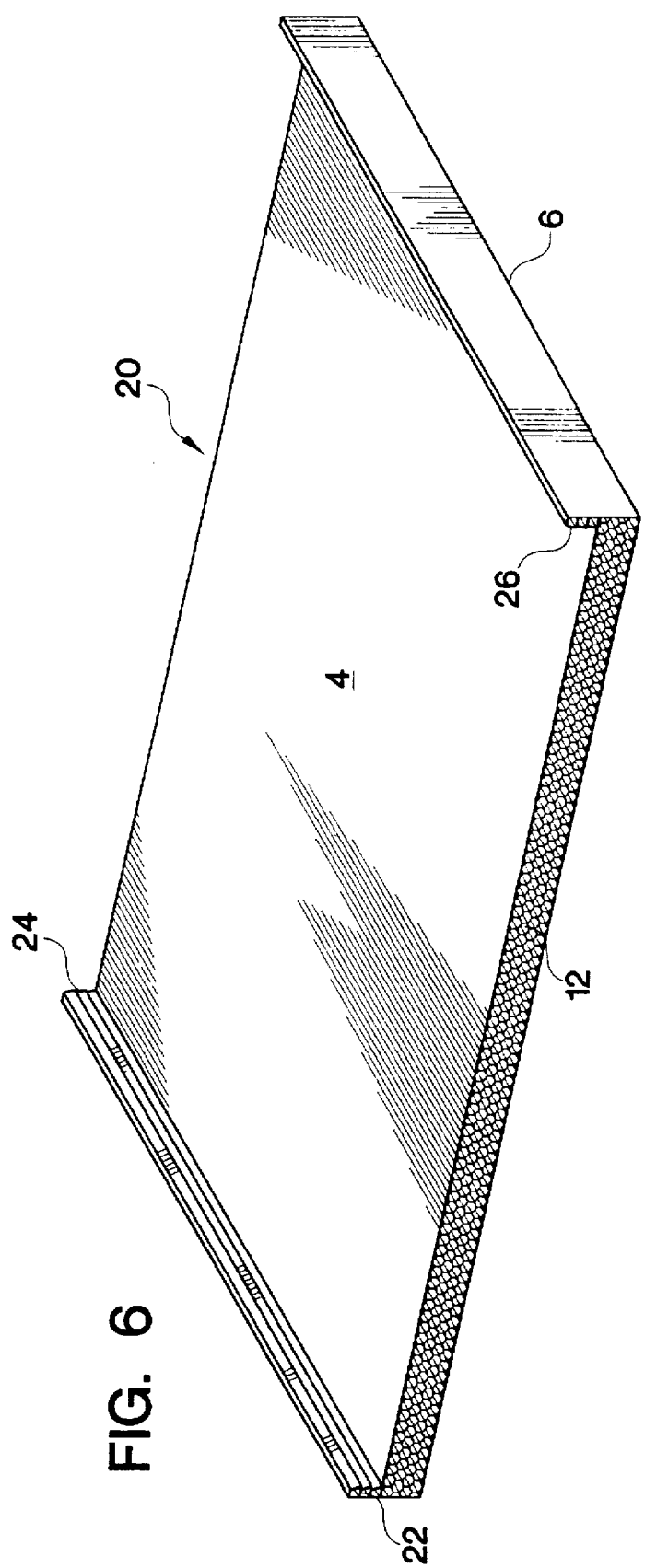
FIG. 6 is a cross-sectional perspective view of another embodiment of the panel according to the invention.
Figure 7:
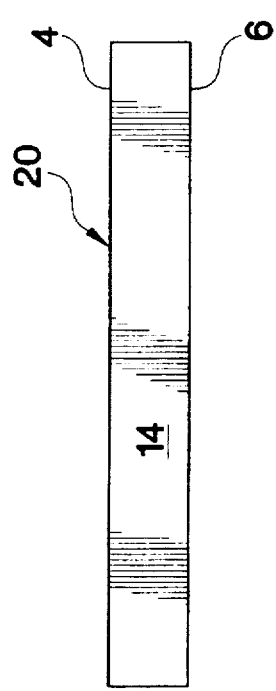
FIG. 7 is a plan view of one end of the embodiment of the panel shown in FIG. 6.
Figure 8:
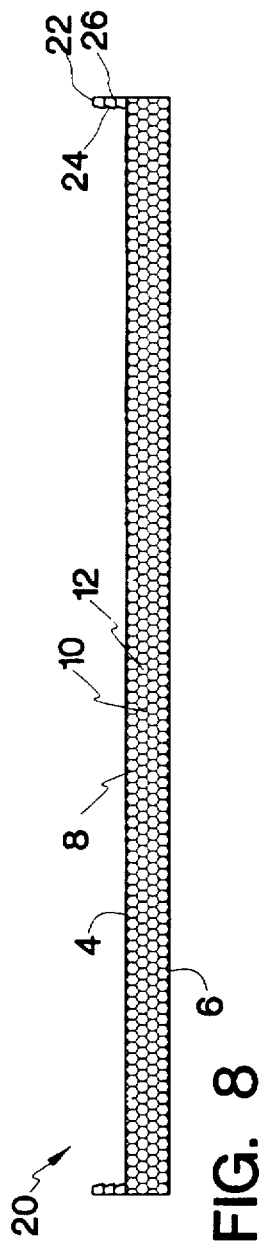
FIG. 8 is a cross-sectional view of the embodiment of the panel shown in FIG. 6.

FIG. 6 shows a second embodiment of the panel 20 which is integrally extruded with a joining flange 22 extending in the direction of extrusion and projecting vertically from or near the edge of said panel. The panel 20 is juxtaposed with a second panel with the respective joining flanges 22 abutting each other. A connecting piece (not shown) is slid over the pair of joining flanges 22. The saw teeth 24 of the joining flanges 22 prevents the connecting piece from being dislodged. The joining flanges 22 may have internal re-enforcing ribs 26 or, alternatively, may be hollow so as to further reduce the weight of the panel.

Figure 9:
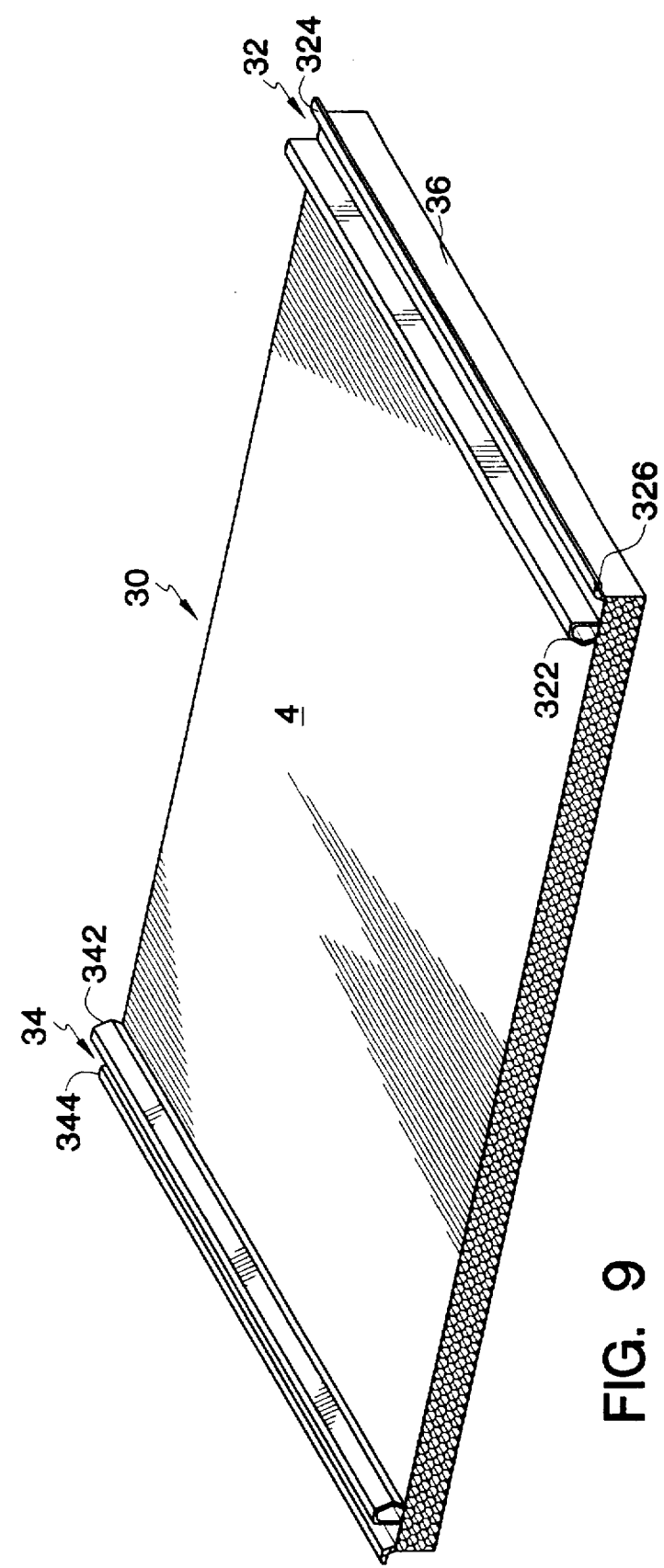
FIG. 9 is a cross-sectional perspective view of a third embodiment of the panel according to the invention.

FIG. 9 shows a third embodiment of panel 30 integrally extruded with a pair of joining flanges 32 and 34. Joining flange 32 having a wall 322 that extends perpendicular to a major surface 4. A second wall 324 perpendicularly extends from the first wall 322 and beyond the edge of the major surface 4 and the sidewall 36 of the panel. The joining flange 32 has internal re-enforcing ribs 326. Joining flange 34 has a first wall 342 that vertically extends from the major surface 4 at a distance from a second edge. A second wall 344 of joining flange 34 laterally extends from the second edge of the major surface 4.

While the honeycomb cells 12 illustrated in the figures are shown as having substantially the same dimensions as discussed above, it should be noted that there may be variations in the length of the walls 8 and 10 of the honeycombs, so as to form subspaces of increasing sizes between the two major surfaces.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, scope of the invention being indicated by the appended claims rather than by the foregoing description, and all changes which come within the meaning in a range of equivalents of the claims are therefore intended to be embraced therein.

What is claimed is:

1. An extruded panel unit for constructional purposes, comprising:
    at least two sheets forming major surfaces and spaced from each other, and
    a honeycomb structure extending parallel with and between said at least two major surfaces, said honeycomb structure having at least three levels of channels extending in a plane parallel to said at least two major surfaces, said honeycomb structure being integral with said at least two major surfaces.

2. The extruded panel as defined in claim 1, wherein the walls of said honeycomb structure have a thickness less than the thickness of said major surfaces.

3. The extruded panel as defined in claim 1, wherein the walls of said honeycomb structure are of equal length.

4. The extruded panel as defined in claim 1, wherein said levels of said honeycomb structure attached to said at least two major surfaces are formed with cells having two walls normal to said at least two major surfaces connected with two angled walls wherein each angled wall is connected to a respective normal wall and extends away from the respective major surface to connect with the other angled wall.

5. The extruded panel as defined in claim 4,
    wherein said levels of said honeycomb structure attached only to other levels of said honeycomb structure are formed with cells having two walls normal to said at least two major surfaces and four angled walls to said normal walls,
    whereby each cell is joined to cells in other levels of said honeycomb structure through respectively shared angled walls.

6. The extruded panel as defined in claim 1,
    wherein said levels of said honeycomb structure attached only to other levels of said honeycomb structure are formed with cells having two walls normal to said at least two major surfaces and four angled walls to said normal walls,
    whereby each cell is joined to cells in other levels of said honeycomb structure through respectively shared angled walls.

7. The extruded panel as defined in claim 1, further comprising at least one joining flange extending in a direction of extrusion, said joining flange projecting at an angle from, at or adjacent to, an edge of said extruded panel.

8. The extruded panel as defined in claim 7, wherein said joining flange has a supporting rib.

9. The extruded panel as defined in claim 7, wherein said at least one joining flange has a connection means for attaching with a second extruded panel.

10. The extruded panel as defined in claim 9, wherein said connection means including at least one saw tooth.

11. The extruded panel as defined in claim 1, further comprising a pair of sidewalls normal to and connected to said major surfaces.

12. The extruded panel as defined in claim 11, wherein said levels of said honeycomb structure attached to one of said at least two major surfaces or said pair of sidewalls are formed with cells having two walls normal to said at least two major surfaces connected with two angled walls wherein each angled wall is connected to a respective normal wall and extends away from the respective major surface to connect with the other angled wall.

13. The extruded panel as defined in claim 11, wherein cells of said honeycomb structure attached only to other cells of said honeycomb structure are formed with cells having two walls normal to said at least two major surfaces and four angled walls to said normal walls, whereby each cell is joined to cells in other levels of said honeycomb structure through a respective shared angled walls.

14. The extruded panel as defined in claim 11, wherein said levels of said honeycomb structure attached to one of said at least two major surfaces are formed with cells having two walls normal to said at least two major surfaces connected with two angled walls wherein each angled wall is connected to a respective normal wall and extends away from the respective major surface to connect with the other angled wall; and said sidewalls are formed such that they fit the contour of said honeycomb structure.

15. The extruded panel as defined in claim 1, further comprising at least one joining flange extending in a direction of extrusion, said joining flange including a first wall extending perpendicular from one major surface, at or adjacent to, an edge of said extruded panel, and a second wall extending along a plane parallel to said one major surface and beyond the edge of said extruded panel.

* * * * *